Sept. 5, 1950 D. W. FETHER 2,521,209
WORK FEEDING MECHANISM FOR MACHINE TOOLS
Filed Feb. 21, 1945 4 Sheets-Sheet 1
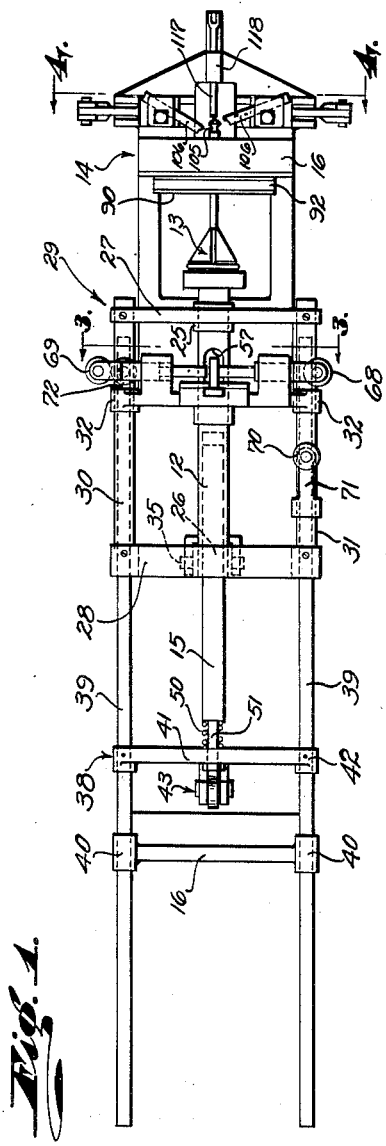
Donald W. Fether
INVENTOR.
BY
ATTORNEY

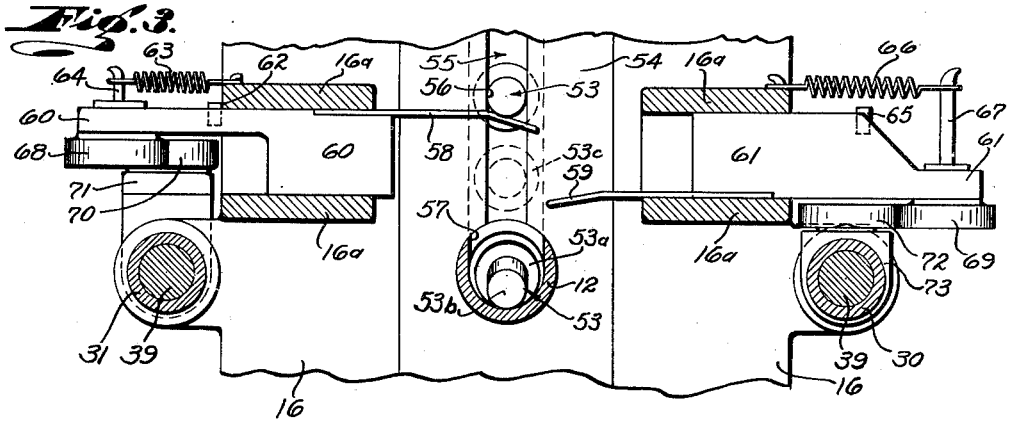
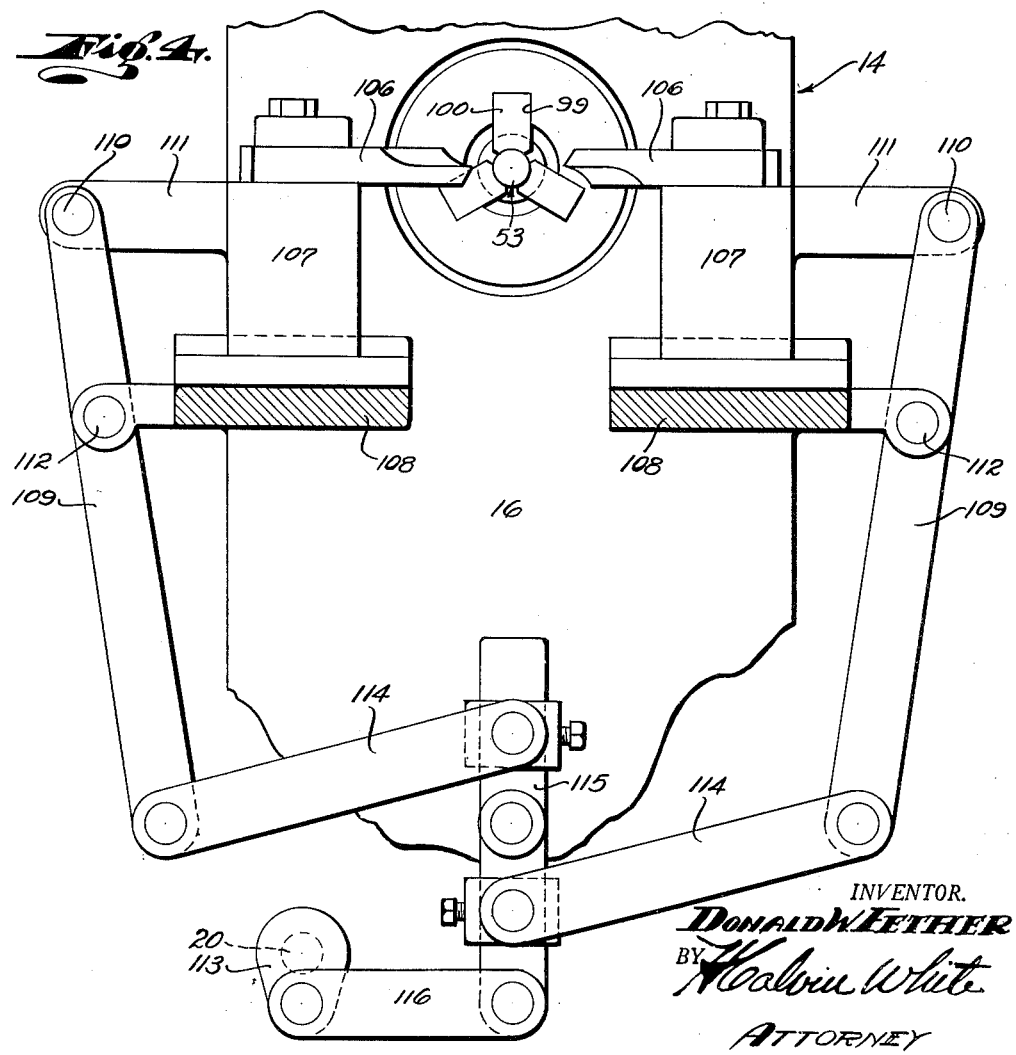

Sept. 5, 1950 D. W. FETHER 2,521,209
WORK FEEDING MECHANISM FOR MACHINE TOOLS
Filed Feb. 21, 1945 4 Sheets-Sheet 3
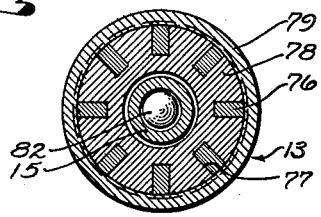
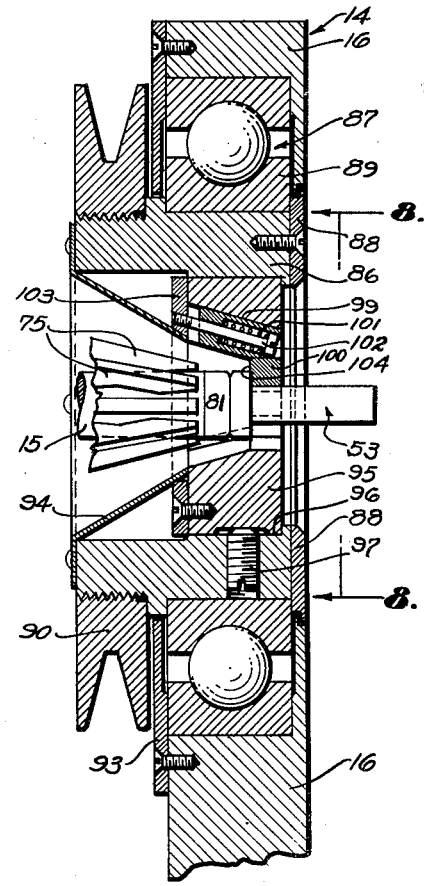
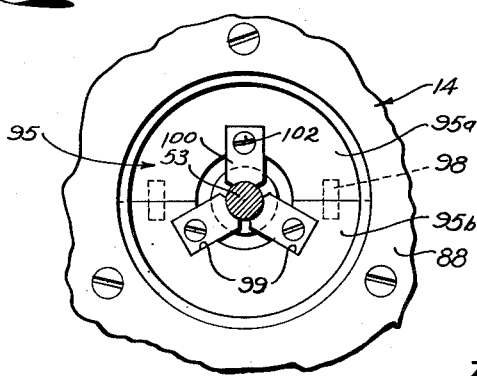
DONALD W. FETHER
INVENTOR.
BY Halvin White
ATTORNEY

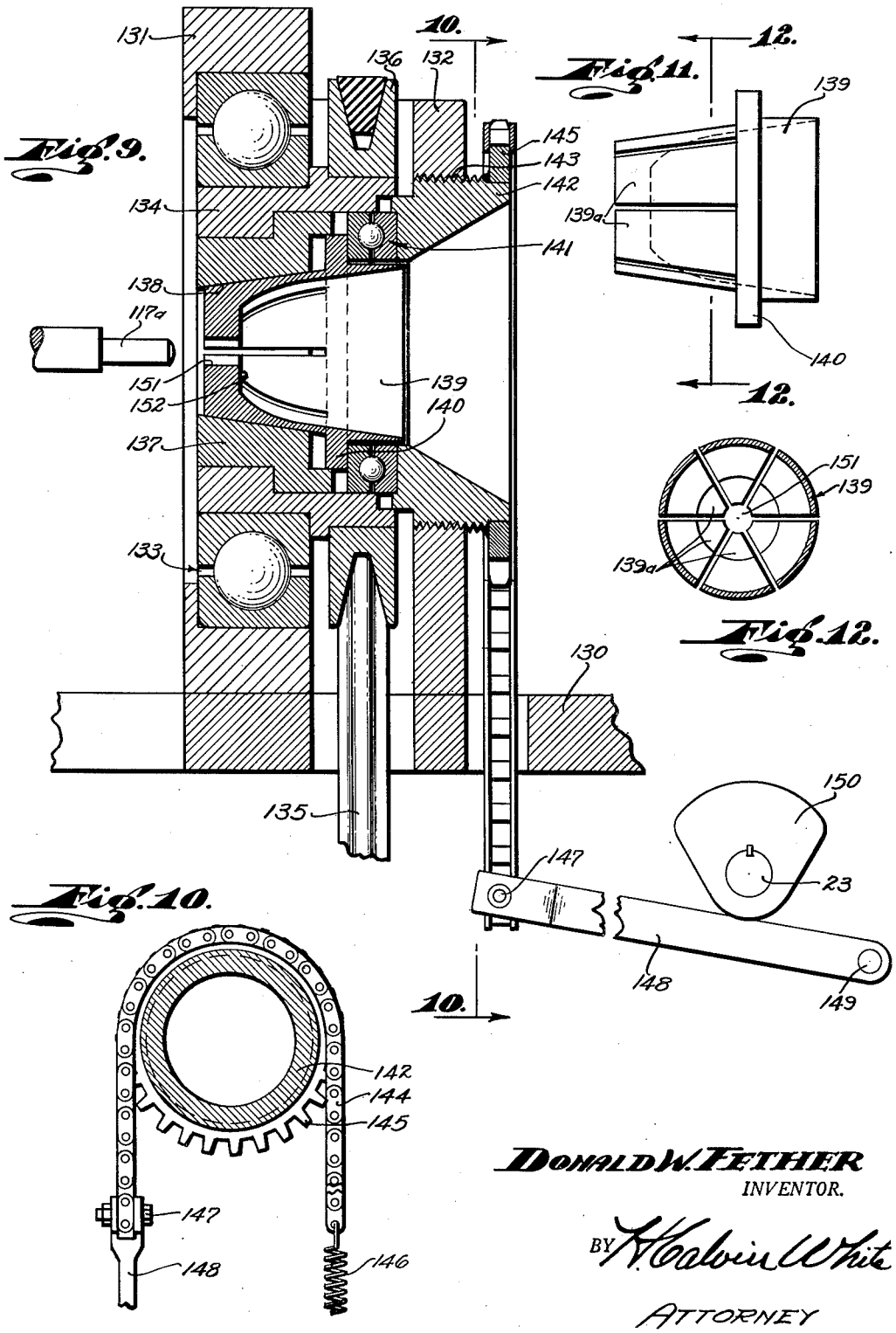

Patented Sept. 5, 1950

2,521,209

UNITED STATES PATENT OFFICE 2,521,209

WORK FEEDING MECHANISM FOR MACHINE TOOLS

Donald W. Fether, Downey, Calif., assignor to National Manufacturing & Sales Company, Downey, Calif., a corporation of California Application February 21, 1945, Serial No. 579,118

19 Claims. (Cl. 10—162)

This invention has to do with improved mechanisms for feeding and shaping work pieces, for example fastener elements, and is particularly concerned with novel feed devices characterized by their ability to accurately and rapidly feed individually a succession of the work pieces to a shaping or cutting mechanism.

One primary object is to depart from the conventional type of feed mechanisms by the use of a barrel-type feeder to which the work pieces are individually delivered for advancement within and out of the barrel by a plunger or the like. A particular feature of the barrel is the provision, in conjunction with one end thereof, of a work piece holding means into and through which the work pieces are projected by the action of the plunger.

A further object is to provide for the simultaneous longitudinal movement of both the barrel and plunger, but at different advancing speeds, so that the barrel is thus permitted to guide and carry the work piece to a chuck or other part of the shaping mechanism, and the plunger is caused ultimately to project the work piece out of the holding means for gripped reception in the chuck.

Also contemplated is a novel association and relationship between the feed mechanism and a revolving chuck adapted to receive and grip the work piece for engagement by a cutting or shaping tool. In this respect the invention provides for advancement of the barrel-carried holding means and sequential travel of the plunger so that the pressure exerted by the plunger serves both to project the work piece into the chuck and to cause the chuck jaws to radially move into gripping engagement with the work piece.

A further feature of the invention is an improved mechanism for initially feeding the work pieces individually into the aforesaid barrel. In accordance with this feature, a succession of the pieces move within a path alternately traversed by a pair of control fingers, all in a manner such that the work pieces are individually fed at a rate determined by the speed of operation of the control fingers.

While various additional features and objects might be recited at length, all aspects of the invention may be most readily understood by proceeding with a description of a typical embodiment in a machine adapted for the shaping of headed rivet stems to form annular recesses therein as required for the known "Hi-Shear" composite type of airplane rivet. The description refers to the accompanying drawings, in which:

Fig. 1 is a general plan view of the mechanism;

Fig. 2 is a side elevation with certain parts appearing in section;

Fig. 3 is a fragmentary enlarged section taken on line 3—3 of Fig. 1;

Fig. 4 is an enlarged fragmentary section taken on line 4—4 of Fig. 1;

Fig. 5 is an enlarged sectional view of the chuck assembly;

Fig. 6 is a fragmentary enlarged section showing the end assembly of the barrel, plunger and work holder;

Fig. 7 is a cross-section on line 7—7 of Fig. 6;

Fig. 8 is a fragmentary end elevation of the chuck assembly as viewed from line 8—8 of Fig. 5;

Fig. 9 is a view similar to Fig. 5, but in relatively reversed position, showing a variational form of chuck assembly;

Fig. 10 is a reduced scale cross-section on line 10—10 of Fig. 9;

Fig. 11 shows the collet part of Fig. 9 in elevation; and

Fig. 12 is a cross-section on line 12—12 of Fig. 11.

Referring first to Figs. 1 and 2, the mechanism may be described generally as comprising means indicated at 10 for feeding individually a succession of work pieces 53 to an axially movable barrel 12 carrying a holder 13 which positions the work pieces for cutting or shaping by the mechanism 14. While typically the invention is shown and described as having for its purpose the shaping of annularly recessed rivet-type elements, it is to be understood that in its broad aspects the invention is not to be regarded as limited to any particular form of work or operation to be performed thereon, and that the construction, arrangement and operation of the mechanism 14 may be variably adapted to suit the requirements of a selected work cutting, shaping or forming operation. It may be further observed that the work elements fed to the barrel 12 are projected forwardly within the barrel into and through the holder 13 by a plunger 15 which is movable simultaneously but differentially with relation to the barrel, to feed the work elements to the mechanism 14 in the progression and manner later explained.

The frame structure and the particular kind and arrangement of the driving mechanisms are of course capable of many specific designs and constructions. Typically, the frame structure 16 is shown to mount both the feed and work shaping mechanisms, as well as a suitable power source, such as motor 17 driving through the usual reduction gear 18 a shaft 19. The latter drives shaft 20 which actuates the cutting tool carriages, as later explained, and also drives by way of belts or chains 21 and 22 a pair of countershafts 23 and 24.

The barrel 12 is supported at 25 and 26 by the cross members 27 and 28 of a reciprocating carriage frame 29. The latter also includes a pair of tubular members 30 and 31 attached to the cross members 27 and 28 slideable within the frame bearings 32. The carriage and barrel assembly is reciprocated axially of the machine by lever 33 pivoted on the frame at 34 and having an upper bifurcated end attached by pin and slot connections 35 to the cross member 28. Lever 33 is actuated in its oscillatory movement by cam 36 keyed to the shaft 23 and engaged by the lever-carried follower roller 37.

The plunger 15 is actuated by way of a carriage frame 38 comprising a pair of rods 39 slidable longitudinally within the tubes 30 and 31 and the frame bearings 40. Cross head 41 fixed at 42 to the rods 39 has a pin and slot connection at 43 with lever 44 pivoted at 45 on the frame and carrying a roller 46 engaging cam 47 keyed to the shaft 24. The levers 33 and 44 may be suitably maintained in engagement with their respective cams, as by means of springs 48 and 49 anchored to the frame. Advancing movement of the cross head 41 is transmitted to the plunger 15 by way of coil spring 50 placed about the end portion 51 of the plunger extending at 52 through an opening in the cross head, provision thus being made for causing the plunger to exert a yielding thrust against the work in the chuck, all as later explained.

The initial work feeding mechanism shown in Fig. 3 is adapted typically for delivery to the barrel 12 of a succession of individual headed rivets 53. This feed mechanism comprises a chute 54 forming a way 55 in which the heads 53a of the rivets are retained with the stems 53b projecting forwardly through a slot 56. The individual feeding of the rivets into the barrel 12 through its opening 57 directly below the chute 55, is controlled by a pair of fingers 58 and 59 which at different times are shifted transversely of the chute in predetermined relation to the movements of the barrel and plunger. Fingers 58 and 59 are carried by blocks 60 and 61 slidable between the frame guides 16a. Inward movement of block 60 is limited by engagement of pin 62 with the frame, and outward movement of the block is resisted by coil spring 63 attached to the frame and the block-carried pin 64. Inward movement of block 61 similarly is arrested by engagement of pin 65 with the frame, and its outward movement is resisted by coil spring 66 attached to the frame and pin 67. Block 60 carries a roller 68 and block 61 carries a similar roller 69.

Roller 68 is engageable by a roller 70 carried by an arm 71, see Figs. 1 and 2, attached to the tubular member 31. Roller 69 similarly is engageable by a roller 72 carried by body 73 attached to the tubular member 30, see Fig. 3.

Figs. 1 and 2 show the carriage 29 and barrel 12, and also the carriage 39 and plunger 15, at the beginning of their forward travels. In this position, roller 72 has engaged and displaced outwardly the roller 69 to retract finger 59 from beneath a rivet positioned as indicated by the dotted lines 53c, to permit the rivet to drop into the barrel 12 through opening 57 which is then positioned directly beneath the chute 55. When the carriage 29 reaches the forward limit of its travel, roller 70 will have engaged and displaced outwardly the roller 68 to retract finger 58 and thereby permit the rivet supported on the finger to drop to the dotted line position 53c, which is then maintained by finger 59 in its inward or projected position. Then upon rearward movement of the carriage 29, finger 58 is returned to the position of Fig. 3 to support the column of rivets above 53c, the end of the finger being inclined to enable it to move in beneath the rivet stem and elevate somewhat the column of rivets above as the finger moves fully inward. Retraction of finger 59 then occurs as block 61 is shifted outward upon restoration of the parts to the position of Fig. 1.

Referring now to Fig. 6, the holding device 13 comprises a plurality of tapered fingers 75 having their inner ends 76 received within radial slots 77 in the head 78 on the forward end of the barrel 12. Flanged nut 79 threaded on the head, retains the fingers within the slots 77. The curvatures of the finger ends 76 permit rocking movement of the fingers at least sufficiently for them to be spread to the positions of Fig. 5 in which the end of the plunger 15 is shown to have been projected through the finger assembly. Radial spreading of the fingers is suitably resisted, as by a coil spring 80 encircling them.

After being dropped through opening 57 into the barrel and during the simultaneous and differential forward movement of the barrel and plunger, the rivet 53 is engaged by the forward end of the plunger 15 which preferably carries a swivel end piece or head 81 rotatable with relation to the plunger proper, against the ball bearing 82. The head 81 is retained within the plunger bore 83 by key pin 84 projecting into annular recess 85 in the stem portion of the head.

The described feed mechanisms operate to deliver the rivets individually for shaping by the mechanism 14 which, as particularly illustrated in Fig. 5, comprises a continuously rotating chuck assembly. The latter typically may include a tubular body 86 journaled by the bearing assembly 87 for rotation within the upstanding portion of the frame 16. At one end the body 86 carries a face plate 88 overlapping the inner race ring 89, and at its opposite end the body carries a sheave wheel 90 driven from the motor shaft 91 by belt 92, see Fig. 2. Attached to the frame is an annular face plate 93 in overlapping relation with the bearing assembly 87. Positioned within the body bore is a frustroconical piece 94 provided primarily to facilitate dropping the shaped rivet out of the chuck when the rivet is displaced by the knock-out pin, as presently described.

The chuck body structure includes a block 95 suitably retained within bore 96, as by set screw 97. As shown in Fig. 8, the block 95 is made in half sections 95a and 95b interconnected by dowels 98, the sectional construction of the block facilitating access to the interior for the formation or machining of the slotted angular ways 99. The block 95 is shown to contain a plurality of jaws 100, typically three, adapted to move radially within the chuck by virtue of their displacement longitudinally in the ways 99. If desired, movement of the jaws in a constricting and work-engaging direction may yieldably be resisted, as by coil springs 101 bearing against the jaws and against the heads of pins 102 received within the jaws and terminating in plate 103 secured to the face of the block. As illustrated, the inner ends 104 of the jaws are shaped to provide shoulders 104 engageable by the rivet head to move the jaws longitudinally within the ways 99 against the resistance of springs 101, and simultaneously radially inward into gripping engagement with the rivet stem, In considering the operation of the feed mechanism in conjunction with the described chuck assembly, note that Fig. 6 illustrates the relative positions of the barrel and plunger at the forward or most advanced position of the barrel. (Figs. 1 and 2 show the barrel and plunger at their fully retracted positions.) In the condition of Fig. 6, the plunger, holder, barrel and rivet assembly is advanced toward the chuck to a position corresponding to the location of the fingers 75 illustrated in Fig. 5. By virtue of the relationship of cams 36 and 47, the plunger 15 continues to move forward and thrust the rivet 53 through the then open jaws and to continue movement of the rivet until its head engages the jaw shoulders 104 and displaces the jaws radially inward into gripping engagement with the rivet stem, holding the latter against rotation. In this condition of the parts, the head 81 and end of the plunger will have been projected through the holding finger assembly, as illustrated. The head 81 is held in its advanced position by cam 47 during the cutting of groove 105. Thereupon, the plunger is retracted back into and through the holder 13, and the plunger and barrel are returned to the positions of Figs. 1 and 2, leaving the rivet engaged in and projecting through the chuck.

While thus held by the chuck, the rivet stem is shaped, typically to form an annular recess 105 (see Fig. 1) in the stem by a pair of cutters 106 carried by a pair of slideable blocks 107 movable transversely on a pair of guides 108 supported by the frame 16. The cutting tool and block assemblies are actuated by levers 109 pivoted at 110 to the block arms 111 and fulcrumed on the frame-supported pivots 112. Arms 109 are connected to crank arm 113 on the motor driven shaft 20, by way of the pivoted links 114 adjustably secured to member 115 which is pivotally connected to the crank arm link 116 and to the frame. By proper timing of the rotation of shaft 20 and adjustment of the linkage system, the cutters 106 are caused to move against and form within the rivet stem the annular recess 105, upon reception of the rivet in gripped association with the chuck. Upon formation of the recess, the cutters are retracted to permit displacement of the shaped rivet out of the chuck.

Referring to Fig. 2, the stem end of the rivet is engageable by a knock-out pin 117 reciprocable within the frame-carried bearing 118 by a lever 119 pivotally fulcrumed at 120 on the frame arm 121. Movement of the knock-out pin is controlled by rod 122 pivotally connected at 123 to the lever 119 and engaging cam 124 keyed to the shaft 23. The rod 122 is suitably urged against the cam surface as by coil spring 125. As soon as the cutters are retracted from the shaped rivet, pin 117 is projected against the rivet to displace it back through the chuck into the throat 94, from which the rivet may drop into a suitable receptacle below, the plunger and holder assembly meanwhile having been retracted out of the chuck, all as previously explained.

In Figs. 9 to 12 I show a variational form of chuck assembly which is of a collet type and differs from the first described form primarily in that the gripping and releasing actions of the chuck are effected independently of the work and its advancing plunger. Here the frame structure 130 is designed to include supports 131 and 132, in the former of which is contained an annular radial bearing assembly 133 within which is journaled the carrier sleeve 134. This sleeve is constantly rotated by belt 135 applied to pulley 136 fixed to the sleeve. A constrictor bushing 137 having a tapered bore 138 is contained within and carried for rotation by the sleeve 134.

A split collet sleeve 139 tapered in conformance with the angularity of bore 138, is movable axially within and relative to the bushing, the collet having an annular flange 140 engaged against the thrust bearing 141. Axial advancement of the collet sleeve is effected by rotation of a ring 142 having at 143 a multiple pitch, fast advancing thread interengaging the threaded bore of the support 132, advancing movement of the ring of course being transmitted through bearing 141 to the collet sleeve. The ring 142 may be rotated reversely and in timed operation with the rivet feeding and shaping mechanisms by any suitable means, such as a chain 144 applied to sprocket 145 carried by the ring, one end of the chain being connected by coil spring 146 to a stationary anchor not shown. The opposite end of the chain is connected at 147 to a lever 148 which oscillates on a stationary pivot 149 and is actuated in its oscillatory movement by cam 150 to be carried on shaft 23, see Fig. 2 and is therefore driven by motor 17.

In operation, the rivet is advanced by and projected out of the holder 13 from the right with relation to Fig. 9, into the collet 139 and through opening 151 defined by the split sections 139a. As will be understood without necessity for further illustration, the rivet is advanced through opening 151 to the point of engagement of the rivet head with the collet surface 152. Thereupon, the cam 150, through lever 148 and the chain 144 turns ring 142 a distance sufficient to advance the collet 139 to the point at which the rivet stem is tightly gripped within the opening 151, the axial advancement of the collet being followed by the plunger head 81, see Fig. 5. After the rivet stem is shaped, as previously described, cam 150 will have rotated to the point of permitting rotational release of the ring 142 by operation of the chain under the influence of spring 146. Immediately thereupon, the knock-out pin 117a, corresponding to pin 117 in Fig. 1, is projected against the shaped rivet and through opening 151 to displace the rivet out of the collet.

I claim:

1. Mechanism of the character described, comprising a horizontally extending barrel, a plunger within the barrel a chute containing a succession of work pieces, means for feeding the work pieces individually from said chute into the barrel, means for producing relative movement of the plunger and barrel to advance a work piece within and out of the barrel, and an operating instrumentality receiving the work piece from the barrel and supporting it independently of the barrel.

2. Mechanism of the character described, comprising a barrel, means for feeding individually a succession of work pieces into the barrel, a plunger within the barrel, means for simultaneously moving both the plunger and barrel longitudinally but at different speeds to project the work piece out of the barrel, and a tool receiving the work piece from the barrel.

3. Mechanism of the character described, comprising a barrel, means for feeding individually a succession of work pieces into the barrel, a plunger within the barrel, means for simultaneously moving both the plunger and barrel longitudinally but at different speeds to project the work piece out of the barrel, a tool receiving the work piece from the barrel, and means actuated by the movement of said barrel for controlling the delivery of the work pieces to the barrel by said feeding means.

4. Mechanism of the character described, comprising a barrel, means for feeding individually a succession of work pieces into the barrel, a plunger within the barrel, movable work holding means carried by one end of the barrel, and means for producing relative movement of the plunger and barrel to advance a work piece within the barrel and through and out of said holding means in a single uninterrupted motion.

5. Mechanism of the character described, comprising a barrel, means for feeding individually a succession of work pieces into the barrel, a plunger within the barrel, movable work holding means carried by one end of the barrel, means for producing relative movement of the plunger and barrel to advance a work piece within the barrel and through said holding means, and a tool receiving the work piece from said holding means and supporting it independently of the barrel.

6. Mechanism of the character described, comprising a barrel, means for feeding individually a succession of work pieces into the barrel, a plunger within the barrel, work holding means carried by one end of the barrel, said holding means comprising a plurality of radially movable fingers displaceable by passage of the work piece between them, and means for producing relative movement of the plunger and barrel to advance a work piece within the barrel and through and out of said holding means in a single uninterrupted motion.

7. Mechanism of the character described, comprising a barrel, means for feeding individually a succession of work pieces into the barrel, a plunger within the barrel, and means for simultaneously moving both the plunger and barrel longitudinally and forwardly at different speeds to advance the work piece in the barrel and to a position at which the work piece is projected out of the barrel, the plunger then moving forwardly without continued forward movement of the barrel.

8. Mechanism of the character described, comprising a barrel, means for feeding individually a succession of work pieces into the barrel, a plunger within the barrel, yieldable work piece holding means carried by the forward end of the barrel, and means for simultaneously moving both the plunger and barrel longitudinally and forwardly at different speeds to advance the work piece within the barrel and to a position at which the work piece is engaged by said holding means, the plunger then moving, without continued forward movement of the barrel, to discharge the work piece from said holding means.

9. Mechanism of the character described, comprising a barrel, means for feeding individually a succession of work pieces into the barrel, a plunger within the barrel, yieldable work piece holding means carried by the forward end of the barrel, and means for simultaneously moving both the plunger and barrel longitudinally and forwardly at different speeds to advance the work piece within the barrel and to a position at which the work piece is engaged by said holding means, the plunger then continuing to move forwardly through said holding means to discharge the work piece therefrom.

10. Mechanism of the character described, comprising a barrel, means for feeding individually a succession of work pieces into the barrel, a plunger within the barrel, yieldable work piece holding means carried by the forward end of the barrel, means for simultaneously moving both the plunger and barrel longitudinally and forwardly at different speeds to advance the work piece within the barrel and to a position at which the work piece is engaged by said holding means, the plunger then continuing to move forwardly through said holding means to discharge the work piece therefrom, and means actuated by the movement of said barrel for controlling the delivery of the work pieces to the barrel through an opening in the side thereof by said feeding means.

11. Mechanism of the character described, comprising a barrel, means for feeding individually a succession of work pieces into the barrel, a plunger within the barrel, means for simultaneously moving both the plunger and barrel longitudinally but at different speeds to project the work piece out of the barrel, a rotating chuck receiving the work piece from the barrel, and means for operating on the work piece while received and rotated by said chuck.

12. Mechanism of the character described, comprising a barrel, means for feeding individually a succession of work pieces into the barrel, a plunger within the barrel, and means for simultaneously moving both the plunger and barrel longitudinally and forwardly at different speeds to advance the work piece in the barrel and to a position at which the work piece is projected out of the barrel, and a rotating chuck adapted to then receive the work piece, the plunger continuing to move forwardly of the barrel at said position of the work piece to project the work piece into the chuck.

13. Mechanism of the character described, comprising a barrel, means for feeding individually a succession of work pieces into the barrel, a plunger within the barrel, yieldable work piece holding means carried by the forward end of the barrel, and means for simultaneously moving both the plunger and barrel longitudinally and forwardly at different speeds to advance the work piece within the barrel and to a position at which the work piece is engaged by said holding means, and a rotating chuck comprising radially movable jaws adapted to then receive the work piece, the plunger continuing to move forwardly of the barrel to project the work piece out of said holding means into the chuck and to exert pressure causing the jaws to grip the work piece.

14. Mechanism of the character described, comprising a barrel, means for feeding individually a succession of headed elements into the barrel, a plunger within the barrel, yieldable element holding means carried by the forward end of the barrel, means for simultaneously moving both the plunger and barrel longitudinally and forwardly at different speeds to advance an element stem forwardly within the barrel and to a position at which the element is engaged by said holding means, and a rotating chuck comprising radially movable jaws adapted to then receive the element, the plunger continuing to move forwardly of the barrel to project the element out of the holding means into the chuck.

15. Mechanism of the character described, comprising a barrel, means for feeding individually a succession of headed rivets into the barrel, a plunger within the barrel, yieldable rivet holding means carried by the forward end of the barrel, means for simultaneously moving both the plunger and barrel longitudinally and forwardly at different speeds to advance a rivet stem forwardly within the barrel and to a position at which the rivet is engaged by said holding means, and a rotating chuck comprising radially movable jaws adapted to then receive the rivet, the plunger continuing to move forwardly of the barrel to project the rivet out of the holding means into the chuck, and means mounting the jaws within the chuck so that they are inwardly movable into gripping relation with the rivet stem by engagement with the rivet head being pressed forward by the plunger.

16. Mechanism of the character described, comprising a barrel, means for feeding individually a succession of work pieces into the barrel, means for advancing a work piece within and out of the barrel, an operating instrumentality receiving the work piece from the barrel and supporting it independently of the barrel, and means for producing axial movement of the barrel toward and away from said operating instrumentality.

17. Mechanism of the character described, comprising a barrel, means for feeding individually a succession of work pieces into the barrel through an opening in the side thereof, means for advancing a work piece within and out of the barrel, a rotating chuck receiving the work piece from the barrel and supporting it independently of the barrel, and means for reciprocally moving the barrel axially with relation to the chuck.

18. Mechanism of the character described, comprising a barrel, means for feeding individually a succession of work pieces into the barrel, a plunger within the barrel, means for producing relative movement of the plunger and barrel to advance a work piece within and out of the barrel, a rotating chuck receiving the work piece from the barrel and supporting it independently of the barrel, and means for producing reciprocating axial movement of the barrel.

19. Mechanism of the character described, comprising a horizontally extending non-rotating barrel, a plunger within the barrel, a chute containing a succession of work pieces, means for feeding the work pieces individually from said chute into the barrel, means for actuating the plunger to project the work piece out of the barrel, a rotating chuck receiving the work piece from the barrel and supporting it independently of the barrel, and means for axially reciprocating the barrel relative to the chuck.

DONALD W. FETHER.

REFERENCES CITED

The following references are of record in the file of this patent:

UNITED STATES PATENTS

| Number | Name | Date |
| --- | --- | --- |
| 405,152 | Euston | June 11, 1889 |
| 755,920 | Olin | Mar. 29, 1904 |
| 835,525 | Hird | Nov. 13, 1906 |
| 1,252,562 | Fassinger | Jan. 18, 1918 |
| 1,463,019 | Mooney | July 24, 1923 |
| 1,718,239 | Kinney | June 25, 1929 |
| 1,718,240 | Kinney | June 25, 1929 |
| 1,982,964 | Rupple | Dec. 4, 1934 |